UNITED STATES PATENT OFFICE.

EUGEN LUDWIG, OF HOBOKEN, NEW JERSEY.

POLISHING-PASTE.

SPECIFICATION forming part of Letters Patent No. 282,913, dated August 7, 1883.

Application filed June 9, 1883. (No specimens.)

*To all whom it may concern:*

Be it known that I, EUGEN LUDWIG, of Hoboken, in the county of Hudson and State of New Jersey, have invented certain new and useful Improvements in Polishing-Paste, of which the following is a specification.

This invention has reference to an improved paste for polishing metals of all kinds; and it consists of powdered rouge, tripoli, Vienna lime, and suitable oil and fats, as will more fully appear hereinafter.

In carrying out my invention twenty-five parts of carefully screened powdered rouge are mixed with forty-five parts of screened tripoli and with ten parts of finely-pulverized Vienna lime. The powder thus obtained is mixed with ten parts of melted tallow, seven parts of olive-oil, and three parts of oil of mirbane, the mass being exposed to such a degree of heat that it has the consistency of dough. While still warm the mass is filled into sheet-metal cans, and is then allowed to cool.

The paste is adapted for cleaning the surfaces of articles made of iron, steel, brass, tin, copper, and other metals, to which it is applied by means of a soft rag, the articles being finally rubbed off with a soft cloth.

Having thus described my invention, I claim as new and desire to secure by Letters Patent—

A polishing-paste composed of powdered rouge, tripoli, Vienna lime, and fatty ingredients to give it consistency, substantially as set forth.

In testimony that I claim the foregoing as my invention I have signed my name in presence of two subscribing witnesses.

EUGEN LUDWIG.

Witnesses:
CARL KARP,
SIDNEY MANN.